(12) United States Patent
Bishop

(10) Patent No.: US 8,487,218 B2
(45) Date of Patent: Jul. 16, 2013

(54) SUPPORT MATRIX ARRANGEMENT

(75) Inventor: Jeffrey C. Bishop, Derby (GB)

(73) Assignee: Rolls-Royce PLC, London (GB)

( * ) Notice: Subject to any disclaimer, the term of this patent is extended or adjusted under 35 U.S.C. 154(b) by 1150 days.

(21) Appl. No.: 12/311,218

(22) PCT Filed: Oct. 1, 2007

(86) PCT No.: PCT/GB2007/003705
§ 371 (c)(1),
(2), (4) Date: Mar. 23, 2009

(87) PCT Pub. No.: WO2008/050080
PCT Pub. Date: May 2, 2008

(65) Prior Publication Data
US 2010/0001161 A1    Jan. 7, 2010

(30) Foreign Application Priority Data

Oct. 27, 2006   (GB) .................................. 0621388.8

(51) Int. Cl.
*F16M 13/00* (2006.01)
(52) U.S. Cl.
USPC .................. 219/158; 219/121.74; 219/121.84
(58) Field of Classification Search
USPC ................. 219/121.74, 121.84, 158; 138/40, 138/42; 248/346.5, 346.01
See application file for complete search history.

(56) References Cited

U.S. PATENT DOCUMENTS

| | | | | |
|---|---|---|---|---|
| 1,701,805 A | * | 2/1929 | Lewis et al. | 48/192 |
| 3,576,966 A | * | 5/1971 | Sullivan | 219/137 R |
| 3,895,210 A | * | 7/1975 | Olson et al. | 219/80 |
| 4,007,908 A | * | 2/1977 | Smagghe et al. | 251/127 |
| 4,697,345 A | * | 10/1987 | Cruce | 30/315 |
| 4,902,418 A | * | 2/1990 | Ziegler | 210/321.77 |
| 4,919,541 A | * | 4/1990 | Grosz-Roell et al. | 366/136 |
| 5,486,383 A | * | 1/1996 | Nowotarski et al. | 427/446 |
| 5,591,241 A | * | 1/1997 | Lavin | 96/362 |
| 5,941,281 A | * | 8/1999 | Baumann et al. | 137/625.33 |
| 5,981,897 A | * | 11/1999 | Offer et al. | 219/75 |
| 6,273,938 B1 | * | 8/2001 | Fanselow et al. | 95/90 |
| 6,575,617 B2 | * | 6/2003 | Fleischli et al. | 366/337 |
| 2009/0045122 A1 | * | 2/2009 | Lin | 210/220 |

FOREIGN PATENT DOCUMENTS

| | | |
|---|---|---|
| DE | 1 515 228 | 6/1971 |
| EP | 1 238 594 A2 | 9/2002 |
| GB | 833837 | 5/1960 |
| GB | 1021732 | 3/1996 |

OTHER PUBLICATIONS

Anonymous, "Welding of Titanium Alloys," *Welding Technology Institute of Australia*, (online), http://www.wtia.com.au/pdf/TGN-MS-02%2, Apr. 21, 2006, pp. 1-6.

* cited by examiner

*Primary Examiner* — Joseph M Pelham
*Assistant Examiner* — Jimmy Chou
(74) *Attorney, Agent, or Firm* — Oliff & Berridge, PLC

(57) ABSTRACT

In a number of practical situations it is desirable to provide consistency with regard to a metering material presentation. For example, with regard to welding and shape metal deposition it is desirable to provide a homogenous vortex free cloud of gas shielding about a work piece prior to and subsequent to processing. Unfortunately, metering meshes are subject to distortion through thermal gradients. By providing a support matrix arrangement comprising a first planar member and a second planar member incorporating ribbon elements and deflector portions bilateral deflection in the plane of the metering mesh can be accommodated whilst outward buckling is avoided. In such circumstances there is consistency with regard to metering mesh presentation and therefore gas flow through shielding.

13 Claims, 1 Drawing Sheet

SUPPORT MATRIX ARRANGEMENT

The present invention relates to support matrix arrangements and more particularly to a support matrix arrangement utilised with respect to a porous flaccid material utilised to act as a diffuser in relation to creating a gas shield or a protective area in such situations as with regard to forming welds.

It will be understood that there are many situations where a support matrix arrangement is required in order to appropriately present a relatively flaccid material. Such situations include presentation of filter material and utilisation with regard to creation of diffusion in a gas flow to avoid vortexes etc. One particular situation where diffusion of a gas flow is important is in relation to argon gas shielding utilised with respect to welding of titanium materials.

It will be understood that it is known to use dedicated chambers which can guarantee a gaseous environment, but such chambers are expensive and potentially cumbersome to use. In such circumstances local shielding is cheaper to operate and run but by the nature of its open air exposure it can be subject to a wider variety of process variations such as changes to draughts, humidity, dynamic and gas inertia effects and general topography of the welding surface. Nevertheless, there are strong commercial incentives to utilise local shielding techniques particularly with regard to forming large shape metal deposition (SMD) and welding structure techniques.

In order to reduce the process variables it is desirable to provide a metering device for a shield in order to eliminate vortexes and draughts etc., in a protective gas flow. This metering device will typically comprise a micro perforated sheet or fine wire mesh that ideally causes a gentle stream free effusion of shielding gas from its surface to form a homogeneous vortex free cloud that completely envelops the weld areas. Experience has indicated that the finer the mesh or the higher density perforations are provided the more vortex free the shield cloud and the less liable it is to dynamic break up or entrainment of spurious edge gases. An often used solution is to pass the protective gas through a wire wool just prior to the metering medium in order to create a randomised and stream free flow which the metering medium then aligns and normalises about the work piece.

It will be appreciated as a mesh becomes finer or the perforations denser in terms of number per unit area, the metering medium tends to become structurally weakened or flaccid and thus highly reactive to local thermal expansion/contraction influences which can lead to distortion of the metering surface. This unreliability and variation in flow rates across the surface leads to a degradation in the uniformity of the gas cloud control. It will be appreciated inherently should a flat surface become distorted the mesh or perforations will open and close in different patches of the surface and then create small but appreciable differences in gas flow through those respective patches causing distortion in use.

In accordance with the present invention there is provided a support matrix arrangement for flaccid material, the matrix arrangement comprising a first planar member and a second planar member overlaying each other with a material between them, the arrangement characterised in that each planar member incorporates ribbon elements to present the material in a substantially flat configuration, the ribbon elements extending across each planar member with at least one deflector portion whereby deflection to accommodate distortion is substantially in the plane of the planar member.

Preferably, the deflector portions in the first planar member mirror the deflector portions in the second planar member either side of the respective overlaying ribbon elements.

Preferably, the deflector portion comprises a loop.

Preferably, the arrangement is provided in a frame. Normally, the ribbon elements extend from one side of the frame to the other in the form of lateral ribbon elements. Preferably, the deflector portions in lateral ribbon elements have a bulbous necked loop configuration, that is to say similar to an Omega sign.

Preferably, intermediate ribbon elements extend between lateral ribbon elements. Preferably, deflector portions in intermediate ribbon elements have a U loop configuration. Preferably, intermediate ribbon elements are substantially S shaped and extend from a base portion of deflector portions in lateral ribbon elements.

Preferably, the ribbon elements have a width less than or equal to the thickness of the planar members.

Preferably, the support matrix arrangement is part of a flow regulator or meter for a gas flow with the material acting as a diffuser between the planar members. Preferably, the diffuser acts to meter a gas flow such as an argon gas flow to act as a shield about a shape metal deposition or weld site.

An embodiment illustrating aspects of the present invention will now be described by way of example and with reference to the accompanying drawings in which.

As indicated above, an ability to constrain a metering device in order to provide consistent diffused flow without vortexes or differentiation is advantageous in a number of situations. A support matrix arrangement in accordance with aspects of the present invention is designed to provide a substantially fixed spatial orientation, that is to say flat arrangement to support a material such as a flaccid porous material utilised to provide diffuse flow across the metering apparatus incorporating the matrix support arrangement. The term 'flaccid' is intended to mean a material that is insufficiently rigid to support itself and therefore requires support, for example a woven cloth. By this approach, the flow control characteristics of the metering device are stabilised over the whole working temperature range to provide gas cloud dynamics as indicated to protect a weld site or shape memory deposition process. In short, the matrix support arrangement in accordance with aspects of the present invention is utilised on both sides of a mesh or porous material in order to prevent it, that is to say the metering mesh, from buckling in either a convex, concave or indeterminate manner providing spurious gas flow results.

Figure 1:
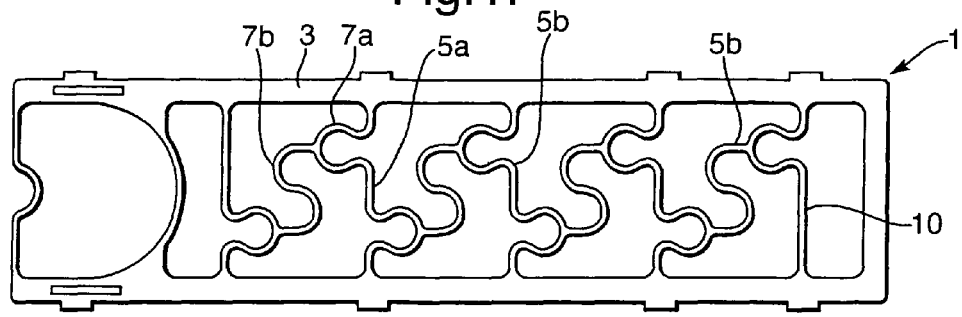
FIG. 1 is a schematic plan view of a first planar member in accordance with aspects of the present invention.
Figure 2:
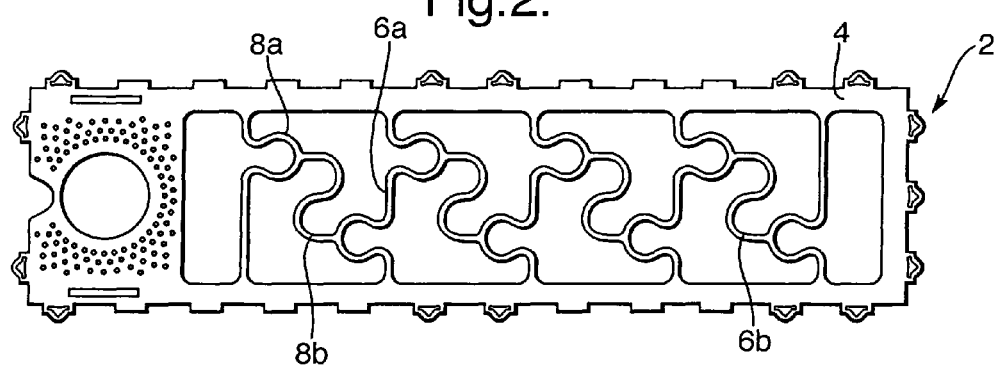
FIG. 2 is a schematic plan view of a second planar member in accordance with aspects of the present invention.
Figure 3:
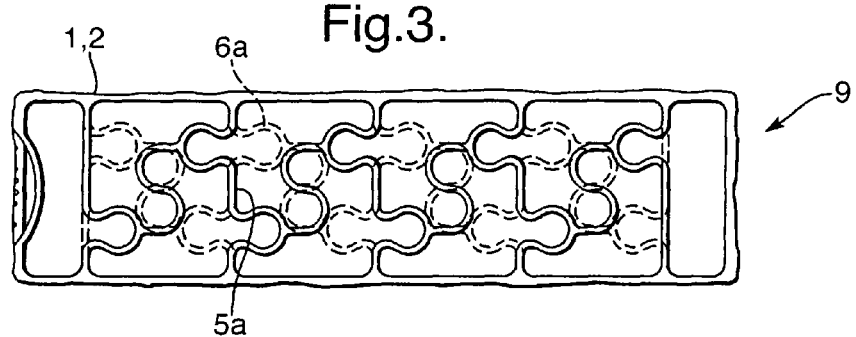
FIG. 3 is a schematic illustration of the planar members illustrated in FIGS. 1 and 2 overlaying each other; and, FIG. 4 is a schematic illustration of utilisation of a support matrix arrangement in accordance with aspects of the present invention with regard to a gas shield about a weld site.

FIGS. 1 to 3 respectively illustrate a first planar member, a second planar member and an assembly of the planar members 1, 2 as an overlay to allow a metering mesh to be located between them. As can be seen, each planar member 1,2 comprises a frame 3, 4 within which ribbon elements 5, 6 extend across from one side to the other in order to support the mesh or porous material between the members 1, 2. The ribbon members 5, 6 are provided as lateral ribbon members 5a, 6a and intermediate ribbon members 5b, 6b. These respective ribbon members 5, 6 incorporate deflector portions 7, 8.

The purpose of the ribbon members 5, 6 and deflector portions 7, 8 is to ensure that an arrangement 9 formed by overlaying the members 1, 2 accommodates bilateral thermal expansion or other distortion in the plane of the arrangement 9, that is to say X and Y directions whilst remaining substantially distortion free in the plane Z perpendicular to this flat plane direction, that is to say perpendicular to the page upon which the Figs. are depicted. It will be appreciated by remaining substantially flat, that the effectiveness of the supported mesh material as a diffuser between the members 1, 2 in the overlaid arrangement 9 is substantially stable in terms of gas control metering over a wide range of temperatures and so achieves consistency and repeatability of presentation of a gas shield and therefore process control.

It will be appreciated in the arrangement 9 depicted in FIG. 3 that the respective ribbons 5, 6 and deflector portions 7, 8 in the respective planar members 1, 2 are mirror images of each other in order to appropriately support the intermediate mesh or porous material. This mirroring is about the major axis of the arrangement. The restrained mesh or mesh material as indicated will be potentially flaccid over the temperature ranges experienced and there will also be thermal expansion and contraction of the respective ribbon elements 5, 6. By appropriate choice of positioning, configuration and shaping of the deflector portions 7, 8 as indicated thermal expansion and contraction can be accommodated by movement of these deflector portions 7, 8 in the plane (X and Y) of the members 1, 2 and therefore distortion outwardly prevented. Such distortion away from the plane of the arrangement 9 as indicated will create disparities and patch differentials in the matrix support which in turn will result in inconsistency in the gas flow metering effect across the arrangement 9.

It will be understood typically the deflector portions 7, 8 as illustrated in FIGS. 1 to 3 will be loops with appropriate shaping, distribution and size to provide the desired deflection response, bilateral thermal expansion and retraction in the plane of the arrangement 9, that is to say members 1, 2 without deflection perpendicular to that plane.

Lateral ribbon members 5a, 6b will generally incorporate bulbous loops which have a neck portion consistent and similar to an Omega sign. Thus, the deflector portions 7a, 7b can open and contract to accommodate expansion and contraction. Intermediate ribbon members 5b, 6b will tend to incorporate U bend loops across bottom base portions, that is to say opposite to the neck part of the lateral deflector portions 7a, 8a in order to again allow expansion and contraction and anchor the other deflector portions to prevent outward buckling. However, as indicated below, the specific configuration of the ribbon members and deflector portions will depend upon particular requirements.

As indicated above the arrangement 9 and therefore the members 1, 2 will be designed to suit the fit, form and function to achieve particular specification requirements in terms of supporting a mesh or metering control or otherwise for a diffuser in the arrangement 9. In such circumstances spacing of the deflector portions, the relative size of deflector portions, the number of deflector portions and their general aspect ratio is not tied to a particular configuration but dependent upon requirements in terms of expected thermal expansion and contraction or other distortions which may be imposed upon the supported metering mesh or matrix. In such circumstances particular configurations of the arrangement will depend upon the thermal or otherwise generated compressive loads in the plane of the arrangement 9 and therefore the deflector portions will be designed to prevent out of plane buckle by arching in plane deflection, that is to say bending of the deflector portions as described above.

It will be appreciated that the ribbon members extend substantially across the metering mesh or porous material and as such may constitute a gas flow blockage area across that mesh which may influence the characteristics of the metering mesh. However, these characteristics will be substantially consistent for the reasons described above, that is to say the arrangement 9 will remain substantially flat and therefore there will be predictability and consistency with regard to the gas metering effect across the arrangement 9. Nevertheless, it is important to consider such factors and therefore the ribbon width and number density of deflector portions will be chosen not to have adverse effects upon the diffuser metering control process of the mesh supported by the arrangement 9 in accordance with aspects of the present invention. As such, as a general rule, the ribbon members will have a width 10 which is equal to or less than the thickness of the members 1, 2. In such circumstances any blocking effects will generally be reduced as the metering mesh, whether it be woven or perforated or otherwise, becomes finer.

Normally, as illustrated, an arrangement 9 in accordance with aspects of the present invention will comprise two members 1, 2 overlaying each other and with mirror or symmetrical presentation of the deflector members. However, although it will add complexity, it will also be appreciated that three or more members with appropriate deflector members may be formed with respective mesh portions between them in order to ensure a flat configuration and therefore consistency with regard to metering effects.

In view of the nature of use it will be appreciated that a matrix support arrangement in accordance with aspects of the present invention will be formed from any appropriate material to enable that mesh to be formed and provide reliable response over the temperature ranges and other conditions such as chemical environments. Generally, the members 1, 2 will be formed from a thin metal material appropriately cut or punched to achieve the desired ribbon members and deflector portions therein. However, in some circumstances plastics materials may be used.

Modifications and alterations to aspects of the present invention as described above will be understood by those skilled in the art. Thus, for example, defector members may be shaped differently to the hooped configurations described above where necessary and appropriate in order to achieve bilateral deflection of the deflector portions preferentially to prevent outward buckling. It will also be understood where appropriate in view of the nature of size and other factors the deflector members may be differently shaped in different portions of the planar members to meet regional or zonal requirements within an arrangement in order to provide again an in plane bilateral deflection rather than outward buckling which would create inconsistencies in presentation and support of the metering mesh or porous material between the planar members.

Figure 4:
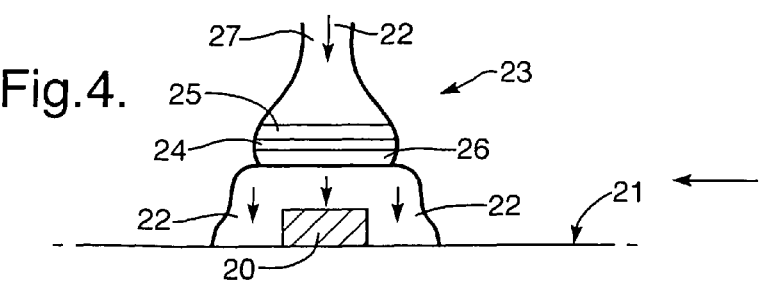

FIG. 4 provides a schematic illustration of usage of a matrix support arrangement in accordance with aspects of the present invention with regard to presenting shielding for the welding process. Thus, a work piece 20 is located upon an appropriate surface 21 such that the gas flow 22 provides local shielding about the work piece 20. This gas flow 22 is presented from a head 23 incorporating a metering mesh 24 between planar members 25, 26 in accordance with aspects of the present invention. The mesh 24 as indicated previously is substantially flat and incorporates perforations or interstices which ensure that the gas flow 22 avoids as much as possible problems with respect to inconsistency of flow over different parts of the work piece 20. By ensuring that the mesh 24, through use of a mesh support arrangement in accordance with aspects of the present invention, remains in a flat configuration there is consistency as indicated with the gas flow 22 cloud and therefore consistency in weld protection both pre-welding and post welding. As indicated previously, a metering device in order to present a shield will provide consistency and so ideally causes a gentle stream free effusion of gas from its surface to give a homogenous vortex free cloud completely enveloping the work piece 20 during pre and post weld stages such that the weld formation or other process such as shape metal deposition (SMD) provides consistent results. In the illustrated example the gas flow is presented through a conduit 27 and a metering mesh 24 causes diffusion to create this homogenous vortex free cloud about the work piece 20.

The invention claimed is:

1. A gas shield for welding, the gas shield having a support matrix arrangement for a porous material, the matrix arrangement comprising: a first planar member and a second planar member overlaying each other with the porous material between them so as to provide a diffuse flow of fluid across the arrangement in use, wherein each planar member comprises a frame and ribbon elements extending across the frame to present the porous material in a substantially flat configuration, the ribbon elements have at least one deflector portion shaped to accommodate thermal expansion and contraction of the ribbon element by arching substantially in the plane of each planar member.

2. A gas shield as claimed in claim 1 wherein the deflector portions in the first planar member mirror the deflector portions in the second planar member either side of the respective overlaying ribbon elements.

3. A gas shield as claimed in claim 1 wherein the at least one deflector portion comprises a loop.

4. A gas shield as claimed in claim 1 wherein the porous material comprises a flaccid material.

5. A gas shield as claimed in claim 4 wherein the frame comprises a plurality of sides and the ribbon elements extend from one side of the frame to another side in the form of lateral ribbon elements.

6. A gas shield as claimed in claim 5 wherein the deflector portions in lateral ribbon elements have a bulbous necked loop configuration, that is to say similar to an Omega sign.

7. A gas shield as claimed in claim 5 wherein intermediate ribbon elements extend between lateral ribbon elements.

8. A gas shield as claimed in claim 7 wherein deflector portions in intermediate ribbon elements have a U loop configuration.

9. A gas shield as claimed in claim 7 wherein intermediate ribbon elements are substantially S shaped and extend from a base portion of deflector portions in lateral ribbon elements.

10. A gas shield as claimed in claim 1 wherein the ribbon elements have a width less than or equal to the thickness of the planar members.

11. A gas shield as claimed in claim 1 wherein the support matrix arrangement is part of a flow regulator or meter for a gas flow with the porous material acting as a diffuser between the planar members.

12. A gas shield as claimed in claim 11 wherein the diffuser is arranged to be located relative to a work piece at a shape memory deposition or weld site.

13. A gas shield as claimed in claim 12 wherein the local shielding comprises a homogenous vortex free gas cloud about the work piece.

* * * * *